United States Patent [19]
Yabuno et al.

[11] Patent Number: 5,601,914
[45] Date of Patent: Feb. 11, 1997

[54] MAGNETIC RECORDING MEDIUM HAVING A BACKCOAT LAYER CONTAINING A TRANSITION METAL FATTY ACID SALT

[75] Inventors: Michio Yabuno; Yoshio Hara; Masami Kuwahara, all of Tokyo, Japan

[73] Assignee: Toyo Ink Manufacturing Co., Ltd., Tokyo, Japan

[21] Appl. No.: 394,160

[22] Filed: Feb. 24, 1995

[30] Foreign Application Priority Data

Feb. 25, 1994 [JP] Japan .................................. 6-027765
Dec. 2, 1994 [JP] Japan .................................. 6-299459

[51] Int. Cl.$^6$ ............................................. G11B 5/71
[52] U.S. Cl. .................. 428/323; 428/328; 428/329; 428/425.9; 428/694 BB; 428/900
[58] Field of Search ........................... 428/694 BB, 323, 428/328, 329, 425.9, 900

[56] References Cited

U.S. PATENT DOCUMENTS

| | | | |
|---|---|---|---|
| 4,663,084 | 5/1987 | Shirai et al. | 252/600 |
| 4,670,333 | 6/1987 | Miyoshi et al. | 428/323 |
| 4,687,709 | 8/1987 | Brinkmeyer et al. | 428/425.9 |
| 4,711,819 | 12/1987 | Hanai et al. | 428/425.9 |
| 4,770,952 | 9/1988 | Papalos | 428/694 |
| 4,937,098 | 6/1990 | Nishikawa et al. | 427/132 |

FOREIGN PATENT DOCUMENTS 60-050722  3/1985  Japan .
60-229227  11/1985  Japan .
61-142529  6/1986  Japan .

*Primary Examiner*—Stevan A. Resan
*Attorney, Agent, or Firm*—Knobbe, Martens, Olson & Bear

[57] ABSTRACT

A magnetic recording medium comprising a magnetic layer and a backing layer respectively on surfaces of a non-magnetic support which are opposite to each other, and a coating material for forming the backing layer. The backing layer is formed from the coating material containing a fatty acid salt having 5 to 11 carbon atoms with therefor a transition metal, a dispersant, a binder, and a filler. The backing layer provides improved properties, such as increased durability, smoothness of surface, electric conductivity, and light shielding.

10 Claims, No Drawings

MAGNETIC RECORDING MEDIUM HAVING A BACKCOAT LAYER CONTAINING A TRANSITION METAL FATTY ACID SALT

BACKGROUND OF THE INVENTION

1. Field of the Invention

The present invention relates to a magnetic recording medium, and a coating material having excellent storage stability for forming a backing layer of a magnetic recording medium. The backing layer has excellent durability, surface smoothness, light shielding, and electric conductivity.

2. Description of the Related Arts

In magnetic recording media, such as video tape of high grades, distal audio tape, and tape for computers, a backing layer is generally formed on a surface of a supporter opposite to a surface having a magnetic layer. The backing layer must provide running stability, prevent therefor generation of static electricity, and shield light so as to detect the end of the tape. A desired filler such as carbon black is usually dispersed in the backing layer to provide electric conductivity and shield light.

While recording density has been increasing in recent years and smoothness of a magnetic layer has been improved, improvement in smoothness of its backing layer is increasingly necessary. When durability and smoothness of the backing layer are insufficient, unevenness of the backing layer is transferred to the magnetic layer, and thus problems such as drop-out and decrease in its SN ratio arise.

While magnetic tape has been made thinner in recent years, improvement in electric conductivity and light shielding of the backing layer are also increasingly necessary. In order to obtain therefor sufficient durability, smoothness of surface, electric conductivity, and light shielding of the backing layer, a filler such as carbon black having a relatively small particle size must be dispersed at a higher concentration with a higher degree of dispersion. However, carbon black having a smaller particle size generally has a larger specific surface area, higher oil absorption, and is difficult to disperse. Furthermore, a coating material prepared by dispersing such carbon black shows poor coating properties due to increased viscosity after long-term storage because of inferior storage stability. Re-aggregation of the filler, such as carbon black, in the coating material also takes place and has an adverse effect on smoothness of the surface of the backing layer.

Improvement in dispersion and stability of a coating material has been attempted by using a resin having a polar group, such as a hydroxyl group, a carboxyl group, or the like. However, sufficient smoothness of a coating layer and sufficient stability of a coating material have not been achieved yet.

In Japanese Patent Application Laid-Open (JP-A) No. 60(1985)-229227, use of a copper salt of a fatty acid having 12 or more carbon atoms was attempted for improving the running property of a coating layer. However, it was found that Young's modulus of the coating layer decreased under the conditions of high temperature and high humidity, and durability of the coating layer deteriorated.

The present invention provides a solution for the problems described above.

Accordingly, an object of the present invention is to provide a magnetic recording medium comprising a backing layer having excellent durability and smoothness of the surface thereof.

Another object of the present invention is to provide a magnetic recording medium which comprises a backing layer having excellent electric conductivity and light shielding and which has an excellent magnetic property as a whole.

Still another object of the present invention is to provide a coating material for forming a backing layer which is suitable for producing a magnetic recording medium such as described above and has improved dispersion of a filler and storage stability.

SUMMARY OF THE INVENTION

To this end, the magnetic recording medium of the present invention comprises a magnetic layer and a backing layer respectively on the surfaces of a non-magnetic support which are opposite to each other, wherein the backing layer is formed from a coating material containing a fatty acid salt having 5 to 11 carbon atoms and a transition metal, a dispersant, a binder, and a filler.

The coating material of the present invention is used for forming a backing layer in a magnetic recording medium on one surface of a support having a magnetic layer on the other surface, and contains a fatty acid salt having 5 to 11 carbon atoms with a transition metal, a dispersant, a binder, and a filler.

The magnetic recording medium of the invention having the essential elements may have, thereon or therebetween, any additional layer.

DETAILED DESCRIPTION OF THE INVENTION

As the fatty acid salt in the present invention, any type of fatty acid salt may be used as long as the fatty acid salt has 5 to 11 carbon atoms. The fatty acid salt defined in the invention may have an alicylic hydrocarbon group. The fatty acid salt may also have a substituent which may contain a heteroatom. However, the fatty acid salt should not have a substituent unless an advantageous effect of the present invention can be achieved to a desired degree. When the fatty acid salt has 12 or more carbon atoms, under the conditions of high temperature and high humidity, Young's modulus of the coating layer and running durability of the coating layer decrease to a large degree. When the fatty acid salt has fewer than 5 carbon atoms, bleeding of the fatty acid salt to the surface of the coating layer takes place and shows unfavorable effects on the magnetic surface. The fatty acid salt preferably has 8 to 10 carbon atoms.

The fatty acid salt in the present invention has a transition metal. The transition metal is preferably an element of the first transition series, more preferably iron, cobalt, nickel, or copper. The transition metal may also be silver, lead, zirconium, or the like. A metal other than the transition metal, such as an alkali metal or an alkaline earth metal, does not show the effect of increasing storage stability of a coating material.

Examples of the fatty acid salt used in the present invention include iron undecylate, cobalt undecylate, copper undecylate, silver undecylate, lead undecylate, nickel undecylate, zirconium undecylate, iron caprate, cobalt caprate, copper caprate, silver caprate, lead caprate, nickel caprate, zirconium caprate, iron peralgonate, cobalt peralgonate, copper peralgonate, silver peralgonate, lead peralgonate, nickel peralgonate, zirconium peralgonate, iron caprylate, cobalt caprylate, copper caprylate, silver caprylate, lead caprylate, nickel caprylate, zirconium caprylate, iron octoate, cobalt octoate, copper octoate, silver octoate, lead octoate, nickel octoate, zirconium octoate, iron naphthenate, cobalt naphthenate, copper naphthenate, silver naphthenate, lead naphthenate, nickel naphthenate, zirconium naphthenate, iron enanthate, cobalt enanthate, copper enanthate, silver enanthate, lead enanthate, nickel enanthate, zirconium enanthate, iron caproate, cobalt caproate, copper caproate, silver caproate, lead caproate, nickel caproate, zirconium caproate, and the like. Among these compounds, naphthenic acid salts are preferable, and cobalt naphthenate, copper naphthenate, and iron naphthenate are particularly preferable. Naphthenate referred to herein is a salt of the homologue of saturated fatty acids having a naphthenic ring, the main components of which are fatty acids having 6 to 11 carbons.

The amount of the fatty acid salt having a transition metal in the backing layer of the present invention is 0.5 to 10 parts by weight, preferably 2 to 5 parts by weight, per 100 parts by weight of the filler, e.g., an inorganic powder such as carbon black. When the amount is more than 10 parts by weight, smoothness of the surface decreases to a large degree.

The fatty acid salt having a transition metal may be incorporated into the backing layer as a single type or as a combination of two or more types.

The ratio by weight of the filler to the binder in the backing layer of the present invention is preferably 5/1 to 0.1/1, more preferably 2/1 to 0.6/1. When the ratio by weight is more than 5/1, smoothness of the surface decreases to a large degree. When the ratio by weight is less than 0.1/1, light shielding decreases.

A combination of a transition metal and a fatty acid or a combination of a transition metal ion and a fatty acid in the coating material for the backing layer as described above makes it possible to remarkably improve stability of the coating material during long-term storage, and to obtain a backing layer having excellent surface smoothness and running durability at a higher temperature and a high humidity.

The filler used in the present invention is not particularly limited as long as a filling function is exhibited. Examples of the filler include carbon black, graphite, titanium oxide, barium sulfate, α-iron oxide, calcium carbonate, alumina, zinc oxide, magnesium carbonate, tin oxide, silica, mica, talc, kaolin, zinc sulfide, and the like. Among these fillers, carbon black, titanium oxide, barium sulfate, α-iron oxide, and calcium carbonate are preferable. Carbon black is particularly preferable among them. The filler may be used as a single type or as a combination of two or more types. The average particle size of the filler is not particularly limited, and preferably 10 to 40 nm for imparting excellent smoothness to the surface. It is more preferable to use a mixture of a filler having an average particle size of 10 to 40 nm and a filler having an average particle size of 40 to 500 nm. The mixture may contain two or more types of these fillers. By using the mixture of fillers, surface smoothness and running durability can be adjusted.

The dispersant used in the present invention is not particularly limited as long as a function for dispersion is exhibited. Examples of the dispersant include known surface-active agents, coupling agents, phosphoric acid esters, resin-type dispersants, chelating agents, organic coloring compounds, and the like. Among these dispersants, organic coloring compounds having a basic end group are preferable, and organic coloring compounds represented by the following general formulae (I) and (II) are particularly preferable:

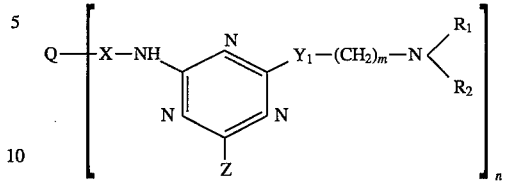

general formula (I)

wherein Q represents an organic coloring residue group, X represents a direct bonding, —CONH—$Y_2$—, —$SO_2$NH—$Y_2$—, or —$CH_2$NHCOCH$_2$NH—$Y_2$— ($Y_2$: a substituted or unsubstituted alkylene or arylene group), $Y_1$ represents —NH— or —O—, Z represents a hydroxyl group, an alkoxy group, or

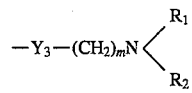

($Y_3$: —NH— or —O—), Z may be —NH—X—Q when n=1, $R_1$ and $R_2$ each independently represent a substituted or unsubstituted alkyl group, or $R_1$ and $R_2$ may link to form at least a heterocyclic ring, m represents an integer of 1 to 6, and n represents an integer of 1 to 4;

$$Q + X - Y]_n \qquad \text{general formula (II)}$$

wherein Q represents an organic coloring residue group, X represents a direct bonding, —CONH—$Y_1$—, —$SO_2$NH—$Y_1$—, or —$CH_2$NHCOCH$_2$NH—$Y_1$— ($Y_1$: a substituted or unsubstituted alkylene or arylene group), Y represents a substituting group represented by one of the following formulae:

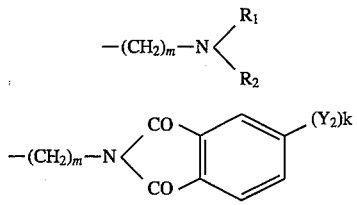

($R_1$ and $R_2$ each independently represent a substituted or unsubstituted alkyl group, or $R_1$ and $R_2$ may link to at least form a heterocyclic ring, $Y_2$ represents a hydrogen atom, a halogen atom, —$NO_2$, —$NH_2$, or —$SO_3H$, k represents an integer of 1 to 4, and m represents an integer of 1 to 6), and n represents an integer of 1 to 4.

The organic coloring residue group in the general formulae (I) and (II) is a residue group derived from a pigment or a dyestuff, such as phthalocyanine coloring agents, azo coloring agents, anthraquinone coloring agents, quinacridone coloring agents, dioxazine coloring agents, anthrapyrimidine coloring agents, anthanthrone coloring agents, indanthrone coloring agents, flavanthrone coloring agents, perylene coloring agents, perynone coloring agents, thioindigo coloring agents, isoindolinone coloring agents, triphenylmethane coloring agents, and benzimidazolone coloring agents. These organic coloring compounds are particularly effective for obtaining a smooth coating surface when the filler is carbon black. The organic coloring compound may be used singly or in combination with other types of known dispersants described above.

The amount of the organic coloring compound in the backing layer of the present invention is 0.1 to 50 parts by weight, preferably 0.5 to 30 parts by weight, per 100 parts by weight of the filler.

The fatty acid salt having a transition metal of the present invention exhibits the maximum advantageous effect when carbon black is used as the filler and an organic coloring compound is used as the dispersant in the coating material. The coating material has excellent stability after long-term storage, and can form a backing layer having excellent surface smoothness and durability.

As the binder of the present invention, any type of binder can be used so long as a binding function is exhibited. Examples of the binder include conventional thermoplastic resins, thermosetting resins, reaction-type resins, cellulose resins, and mixtures of these materials. Examples of the thermoplastic resin include resins having a glass transition temperature of −100° to 150° C. and a number-average molecular weight of 1000 to 200000, preferably 10000 to 100000, such as polymers and copolymers containing vinyl chloride, vinyl acetate, vinyl alcohol, maleic acid, acrylic acid, acrylic esters, vinylidene chloride, acrylonitrile, styrene, vinyl butyral, vinyl acetal, and the like, as a constituting unit; polyurethane resins; polyester resins; and rubber type resins. Examples of the thermosetting resin include phenol resins, epoxy resins, phenoxy resins, polyurethane curable resins, urea resins, melamine resins, alkyd resins, acrylic resins, formaldehyde resins, silicone resins, mixtures of polyester resins and isocyanate prepolymers, mixtures of a polyester polyola and a polyisocyanate, mixtures of a polyurethane and a polyisocyanate, and the like. Examples of the cellulose resin include nitrocellulose, ethylcellulose, cellulose acetate butyrate, cellulose acetate propionate, and the like.

The resins described above may be used singly or in therefor a combination of two or more types. Among the combinations of the resins, preferable are a combination of a polyurethane resin and one type of resin selected from the group consisting of vinyl chloride resin, vinyl chloride/vinyl acetate resin, vinyl chloride/vinyl acetate/vinyl alcohol resin, vinyl chloride/vinyl acetate/maleic anhydride resin, vinyl chloride/acrylic ester resin, nitrocellulose, and phenoxy resin; and a combination of the above combination of resins and a polyisocyanate. A combination of nitrocellulose, urethane resin, and a polyisocyanate, and a combination of vinyl chloride resin, urethane resin, and a polyisocyanate, are particularly preferable.

As the vinyl chloride copolymer, preferable is a copolymer which comprises a repeating unit of vinyl chloride, a repeating unit having an epoxy group, and a repeating unit having a polar group, such as —$SO_3M$, —$OSO_3M$, COOM, —$PO(OM)_2$ (M in these formulae represents a hydrogen atom or an alkali metal).

As the urethane resin, any type of urethane resin, such as polyester polyurethane, polyether polyurethane, polycarbonate polyurethane, or polycaprolactone polyurethane, may be used. There may be used a polyurethane resin which contains at least one polar group selected from COOM, —$SO_3M$, —$OSO_3M$, —$PO(OM)_2$ (M in these formulae represents a hydrogen atom or an alkali metal), —OH, $NR_2$, $N^+R_3$ (R in these formulae represents a hydrocarbon group), epoxy group, sulfobetain group, and the like, if necessary.

As the polyisocyanate, use can be made of isocyanates, such as tolylene diisocyanate, 4,4'-diphenylmethane diisocyanate, hexamethylene diisocyanate, xylylene diisocyanate, ortho-toluidine diisocyanate, isophorone diisocyanate and triphenylmethane triisocyanate; products from any of these isocyanates and a polyalcohol; and polyisocyanates formed by condensation of isocyanate(s).

The polyisocyanate reacts with the polar group in the binder to form three-dimensional crosslinking and exhibits the effect of increasing strength and durability of a coating layer.

The coating material for forming the backing layer of the present invention can be prepared by a conventional method. For example, a fatty acid salt having a transition metal, a dispersant, and a filler are mixed with a solution which is prepared by dissolving part or all of a binder in an organic solvent, such as methyl ethyl ketone, toluene, methyl isobutyl ketone, butyl acetate, cyclohexanone, or tetrahydrofuran. The mixture is dispersed by using a dispersing machine, such as a two-roll mill, a three-roll mill, a sand mill, an attriter, a kneader, or a dissolver. To the mixture described above, a known lubricant, curing catalyst, or fungicide, may be added, if necessary. It is also preferable that the polyisocyanate used as the curing agent be mixed into the coating material immediately before applying the backing layer of the magnetic recording medium.

EXAMPLES

The present invention is described with reference to examples in the following. In the examples, "part" and "%" represent respectively "part by weight" and "% by weight".

Examples 1 to 5

| | |
|---|---|
| cobalt-containing γ-$Fe_2O_3$ | 100 parts |
| vinyl chloride resin | 10 parts |
| (MR-100, a product of Nippon Zeon Co., Ltd.) | |
| urethane resin | 10 parts |
| (N-2301, a product of Nippon Polyurethane Co., Ltd.) | |
| alumina | 5 parts |
| toluene | 120 parts |
| methyl ethyl ketone | 120 parts |
| cyclohexanone | 60 parts |

To a magnetic layering material prepared by dispersing the composition described above by a sand mill, 3 parts of an isocyanate compound (Coronate L, a product of Nippon Polyurethane Co., Ltd.), 1 part of myristic acid, and 1 part of n-butyl stearate were added. The mixture was applied on a support of polyethylene terephthalate of 10 μm thickness, treated for orientation, dried, and subjected to mirror finishing by calendering, to prepare a magnetic layer of 3 μm thickness.

A backing layer composition containing the following components was separately dispersed by using a sand mill, and then 20 parts of Coronate L was added to the dispersion. The carbon black dispersion thus obtained was applied to the support having the magnetic layer prepared above, on the surface opposite to a surface having the magnetic layer. The coated dispersion was then dried to form a backing layer of 0.7 μm thickness. A magnetic tape was prepared by cutting the laminate thus prepared to the width of ½ inch.

| | |
|---|---|
| carbon black | 100 parts |
| (MA-7, a product of Mitsubishi Kasei Co., Ltd.) | |
| fatty acid salt having 5 to 11 carbon atoms and a transition metal which is shown in Table 1 | 3 parts |
| dispersant | 5 parts |
| [an organic coloring compound below (Chemical Formula 1)] | |

-continued

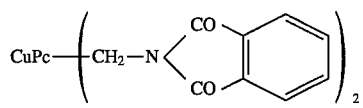

| | |
|---|---|
| urethane resin (N-2301, a product of Nippon Polyurethane Co., Ltd.) | 40 parts |
| nitrocellulose (Celluline FM-200S, a product of Daicel Co., Ltd.) | 60 parts |
| toluene | 640 parts |
| methyl ethyl ketone | 640 parts |
| cyclohexanone | 170 parts |

TABLE 1

| fatty acid salt having 5 to 11 carbon atoms and a transition metal | |
|---|---|
| Example 1 | cobalt naphthenate |
| Example 2 | iron naphthenate |
| Example 3 | copper naphthenate |

TABLE 1-continued

| fatty acid salt having 5 to 11 carbon atoms and a transition metal | |
|---|---|
| Example 4 | zirconium octoate |
| Example 5 | copper caprylate |

Example 6

A magnetic tape was prepared by the same method as that in Examples 1 to 5 except that a vinyl chloride resin (MR-110, a product of Nippon Zeon Co., Ltd.) was used in the backing layer composition in place of nitrated cotton used in Example 1.

Examples 7 to 11

A magnetic tape was prepared by the same method as that in Examples 1 to 5 except that one of the following organic coloring compounds (Chemical Formulae 2 to 6) was used in the backing layer composition in place of the organic coloring compound used in Example 1.

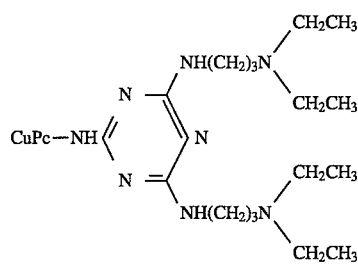

2

3

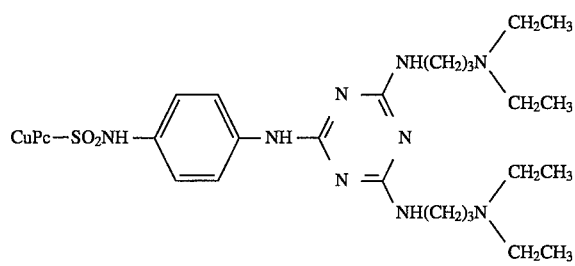

4

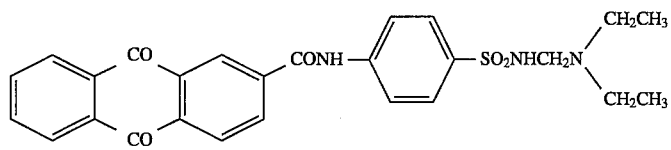

5

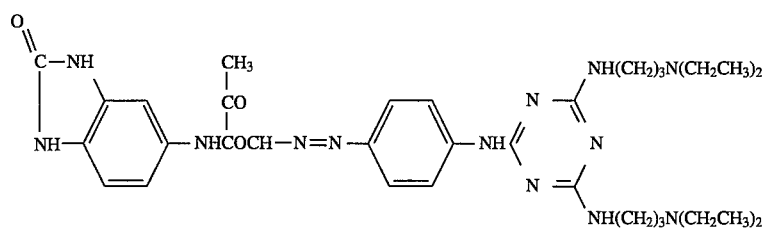

6

Comparative Example 1

A magnetic tape was prepared by the same method as that in Examples 1 to 5 except that the fatty acid salt having 5 to 11 carbon atoms and a transition metal was not used in the backing layer composition.

Comparative Examples 2 to 4

A magnetic tape was prepared by the same method as that in Examples 1 to 5 except that a fatty acid having 5 to 11 carbon atoms and a non-transition metal shown in Table 2 was used in the backing layer composition in place of the fatty acid having 5 to 11 carbon atoms with a transition metal used in Examples 1 to 5.

TABLE 2

| fatty acid salt having 5 to 11 carbon atoms and a non-transition metal | |
|---|---|
| Comparative Example 2 | sodium octoate |
| Comparative Example 3 | sodium naphthenate |
| Comparative Example 4 | magnesium octoate |

Comparative Examples 5 to 9

A magnetic tape was prepared by the same method as that in Examples 1 to 5 except that a fatty acid salt having 12 or more carbon atoms shown in Table 3 was used in the backing layer composition in place of the fatty acid salt having 5 to 11 carbon atoms with a transition metal used in Examples 1 to 5.

TABLE 3

| fatty acid salt having 12 or more carbon atoms | |
|---|---|
| Comparative Example 5 | copper oleate |
| Comparative Example 6 | magnesium oleate |
| Comparative Example 7 | sodium oleate |
| Comparative Example 8 | copper stearate |
| Comparative Example 9 | sodium stearate |

Comparative Examples 10 to 12

A magnetic tape was prepared by the same method as that in Examples 1 to 5 except that a fatty acid shown in Table 4 was used in the backing layer composition in place of the fatty acid salt having 5 to 11 carbon atoms with a transition metal used in Examples 1 to 5.

TABLE 4

| fatty acid | |
|---|---|
| Comparative Example 10 | stearic acid |
| Comparative Example 11 | oleic acid |
| Comparative Example 12 | naphthenic acid |

Comparative Example 13

A magnetic tape was prepared by the same method as that in Examples 1 to 5 except that the dispersant of the organic coloring compound (Chemical Formula 1) used in Example 1 was not used in the backing layer composition.

Using the magnetic tapes prepared in Examples 1 to 10 and Comparative Examples 1 to 13, average roughness for the center line of the surface (Ra), 45° mirror surface reflectivity, electric resistance at the surface, and durability of the backing layer were evaluated. Fluidity and storage stability of the backing layer composition were also evaluated. Results are shown in Table 5. For evaluation of the durability of the backing layer, a tape having no magnetic layer was prepared. Young's modulus of this tape was measured before and after the tape was left standing for 6 hours at a high temperature and a high humidity (80° C.×RH 90%), and retention of Young's modulus was obtained from the decrease in Young's modulus by the treatment. Durability was evaluated from the retention of Young's modulus. For evaluation of the storage stability of the backing layer composition, a backing layer composition prepared above was left standing at 40° C. for 30 days, and then used for preparation of a tape. The average roughness for the center line of the surface (Ra), the 45° mirror surface reflectivity, the electric resistance at the surface, and durability of the tape thus prepared were measured. The average roughness of the surface Ra was measured by using a surface roughness meter of a contact needle type (a needle of 1μ) according to Japanese Industrial Standard B-0601-1982 with a cut-off value of 0.08 mm.

TABLE 5

| | Initial properties Properties of a tape prepared by using an initial coating material | | | | | Properties after time passed (40° C. × 30 days) Properties of a tape prepared by using a coating material after time passed | | | | |
|---|---|---|---|---|---|---|---|---|---|---|
| | Ra (nm) | 45° mirror surface Reflectivity (%) | electric resistance at the surface ($\Omega/\square$) | FCM | *RYM (%) | Ra (nm) | 45° mirror surface Reflectivity (%) | electric resistance at the surface ($\Omega/\square$) | FCM | *RYM (%) |
| Example | | | | | | | | | | |
| 1 | 11 | 153 | $4 \times 10^5$ | ◯ | 96 | 11 | 151 | $2 \times 10^5$ | ◯ | 94 |
| 2 | 9 | 158 | $3 \times 10^5$ | ◯ | 94 | 10 | 153 | $3 \times 10^5$ | ◯ | 92 |
| 3 | 10 | 156 | $2 \times 10^5$ | ◯ | 94 | 10 | 151 | $2 \times 10^5$ | ◯ | 94 |
| 4 | 11 | 152 | $3 \times 10^5$ | ◯ | 92 | 11 | 146 | $2 \times 10^5$ | ◯ | 92 |
| 5 | 11 | 150 | $5 \times 10^5$ | ◯ | 94 | 12 | 146 | $8 \times 10^5$ | ◯ | 92 |

TABLE 5-continued

| | Initial properties Properties of a tape prepared by using an initial coating material | | | | | Properties after time passed (40° C. × 30 days) Properties of a tape prepared by using a coating material after time passed | | | | |
|---|---|---|---|---|---|---|---|---|---|---|
| | Ra (nm) | 45° mirror surface Reflectivity (%) | electric resistance at the surface (Ω/□) | FCM | *RYM (%) | Ra (nm) | 45° mirror surface Reflectivity (%) | electric resistance at the surface (Ω/□) | FCM | *RYM (%) |
| 6 | 13 | 145 | $6 \times 10^5$ | O | 92 | 14 | 140 | $8 \times 10^5$ | O | 92 |
| 7 | 9 | 158 | $2 \times 10^5$ | O | 95 | 10 | 152 | $3 \times 10^5$ | O | 93 |
| 8 | 10 | 155 | $3 \times 10^5$ | O | 96 | 10 | 150 | $2 \times 10^5$ | O | 94 |
| 9 | 11 | 150 | $4 \times 10^5$ | O | 95 | 11 | 144 | $3 \times 10^5$ | O | 94 |
| 10 | 11 | 152 | $6 \times 10^5$ | O | 94 | 11 | 148 | $5 \times 10^5$ | O | 94 |
| Comparative example | | | | | | | | | | |
| 1 | 16 | 134 | $1 \times 10^5$ | O | 94 | 80 | 82 | $2 \times 10^5$ | x | 88 |
| 2 | 17 | 132 | $4 \times 10^5$ | O | 78 | 60 | 80 | $8 \times 10^5$ | x | 58 |
| 3 | 17 | 130 | $4 \times 10^5$ | Δ | 72 | 75 | 62 | $1 \times 10^5$ | x | 60 |
| 4 | 19 | 125 | $5 \times 10^5$ | Δ | 78 | 82 | 68 | $1 \times 10^5$ | x | 52 |
| 5 | 12 | 146 | $3 \times 10^5$ | O | 20 | 13 | 140 | $5 \times 10^5$ | O | 16 |
| 6 | 17 | 132 | $4 \times 10^5$ | O | 22 | 68 | 72 | $9 \times 10^5$ | x | 10 |
| 7 | 17 | 130 | $5 \times 10^5$ | Δ | 20 | 78 | 64 | $1 \times 10^5$ | x | 10 |
| 8 | 13 | 142 | $4 \times 10^5$ | O | 42 | 14 | 138 | $6 \times 10^5$ | O | 38 |
| 9 | 16 | 135 | $3 \times 10^5$ | O | 40 | 54 | 78 | $9 \times 10^5$ | x | 12 |
| 10 | 16 | 130 | $4 \times 10^5$ | O | 45 | 66 | 72 | $1 \times 10^5$ | x | 16 |
| 11 | 15 | 135 | $4 \times 10^5$ | O | 30 | 64 | 90 | $9 \times 10^5$ | x | 12 |
| 12 | 16 | 134 | $3 \times 10^5$ | O | 78 | 50 | 82 | $8 \times 10^5$ | x | 60 |
| 13 | 15 | 140 | $3 \times 10^5$ | O | 94 | 15 | 136 | $5 \times 10^5$ | O | 94 |

FCM: Fluidity of coating material
RYM: Retention of Young's modulus
*: A higher value of retention of Young's modulus shows more excellent durability of the cotaing layer.

As clearly shown in Table 5, durability and the surface properties of the backing layer were remarkably improved when a fatty acid having 5 to 11 carbon atoms with a transition metal was contained. The fluidity and the storage stability of the backing layer composition were also remarkably improved. Therefore, it can be understood that the coating material of the present invention has excellent long-term storage stability.

What is claimed is:

1. A magnetic recording medium comprising a magnetic layer and a backing layer, each formed on a different side of a non-magnetic support, said backing layer being formed from a coating material comprising 0.5 to 10 parts by weight of a transitional metal-containing fatty acid salt having 5–11 carbon atoms, 0.1 to 50 parts by weight of an organic coloring compound of formula I or II, 100 parts by weight of carbon black, and 20 to 1,000 parts by weight of a binder:

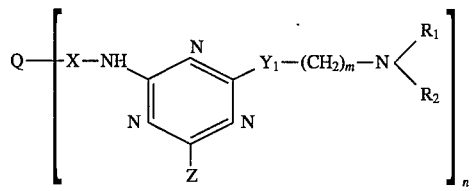

formula (I)

wherein Q represents an organic coloring residue group derived from a coloring agent selected from the group consisting of phthalocyanine, benzimidazolone, anthraquinone, and qunacridone, X represents a direct bond, —CONH—$Y_2$—, or —$SO_2$NH—$Y_2$— ($Y_2$: a phenylene), $Y_1$ represents —NH—, Z represents a hydroxyl group, or

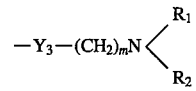

($Y_3$: —NH—), $R_1$ and $R_2$ each independently represents an alkyl group having 1–4 carbon atoms, m represents an integer of 3, and n represents an integer of 1;

$$Q + X - Y]_n \quad \text{formula (II)}$$

wherein Q represents an organic coloring residue group derived from a coloring agent selected from the group consisting of phthalocyanine, benzimidazolone, anthraquinone, and qunacridone, X represents a direct bond, —CONH—$Y_1$—, —$SO_2$NH—$Y_1$—, —$CH_2$NHCOCH$_2$NH—$Y_1$— ($Y_1$: a methylene), or —CONH-φ-$SO_2$NH— (φ: a phenylene), Y represents a substituted group represented by one of the following formulae:

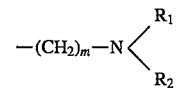

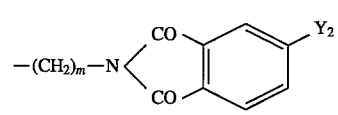

($R_1$ and $R_2$ each independently represent an alkyl group having 1–4 carbon atoms, $Y_2$ represents a hydrogen atom, and m represents an integer of 1 or 2), and n represents an integer of 1 or 2.

2. A magnetic recording medium according to claim 1, wherein the fatty acid salt has 8 to 10 carbon atoms.

3. A magnetic recording medium according to claim 1, wherein the transition metal is selected from the group consisting of iron, cobalt, nickel, and copper.

4. A magnetic recording medium according to claim 1, wherein the fatty acid salt is a naphthenic acid salt.

5. A magnetic recording medium according to claim 4, wherein the naphthenic acid salt is at least one compound selected from the group consisting of cobalt naphthenate, copper naphthenate, and iron naphthenate.

6. A magnetic recording medium according to claim 1, wherein the amount of the fatty acid salt in the backing layer is from 2 to 5 parts by weight per 100 parts by weight of carbon black, and the ratio by weight of the carbon black to the binder is from 2/1 to 0.6/1.

7. A magnetic recording medium according to claim 1, wherein the binder is a combination of nitorocellulose, a urethane resin, and a polyisocyanate, or a combination of polyvinyl chloride resin, a urethane resin, and a polyisocyanate.

8. A coating material for forming a backing layer in a magnetic recording medium on the surface of a support opposite to the surface having a magnetic layer, said coating material comprising 0.5 to 10 parts by weight of a transitional metal-containing fatty acid salt having 5–11 carbon atoms, 0.1 to 50 parts by weight of an organic coloring compound of formula I or II, 100 parts by weight of carbon black, and 20 to 1,000 parts by weight of a binder:

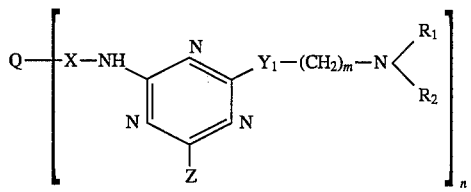

formula (I)

wherein Q represents an organic coloring residue group derived from a coloring agent selected from the group consisting of phthalocyanine, benzimidazolone, anthraquinone, and qunacridone, X represents a direct bond, —CONH—$Y_2$—, or —SO$_2$NH—$Y_2$— ($Y_2$: a phenylene), $Y_1$ represents —NH—, Z represents a hydroxyl group, or

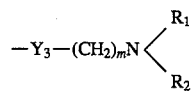

($Y_3$: —NH—), $R_1$ and $R_2$ each independently represents an alkyl group having 1–4 carbon atoms
m represents an integer of 3, and n represents an integer of 1;

$$Q + X - Y ]_n \qquad \text{formula (II)}$$

wherein Q represents an organic coloring residue group derived from a coloring agent selected from the group consisting of phthalocyanine, benzimidazolone, anthraquinone, and qunacridone, X represents a direct bond, —CONH—$Y_1$—, —SO$_2$NH—$Y_1$, —CH$_2$NHCOCH$_2$NH—$Y_1$—($Y_1$: a methylene), or —CONH-φ-SO$_2$NH— (φ: a phenylene), Y represents a substituted group represented by one of the following formulae:

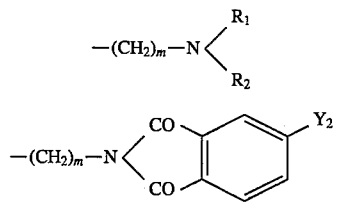

($R_1$ and $R_2$ each independently represent an alkyl group having 1–4 carbon atoms, $Y_2$ represents a hydrogen atom, and m represents an integer of 1 or 2), and n represents an integer of 1 or 2.

9. A coating material according to claim 8, wherein the fatty acid salt is a naphthenic acid salt.

10. A coating material according to claim 9, wherein the naphthenic acid salt is at least one compound selected from the group consisting of cobalt naphthenate, copper naphthenate, and iron naphthenate.

* * * * *